Figure 1:
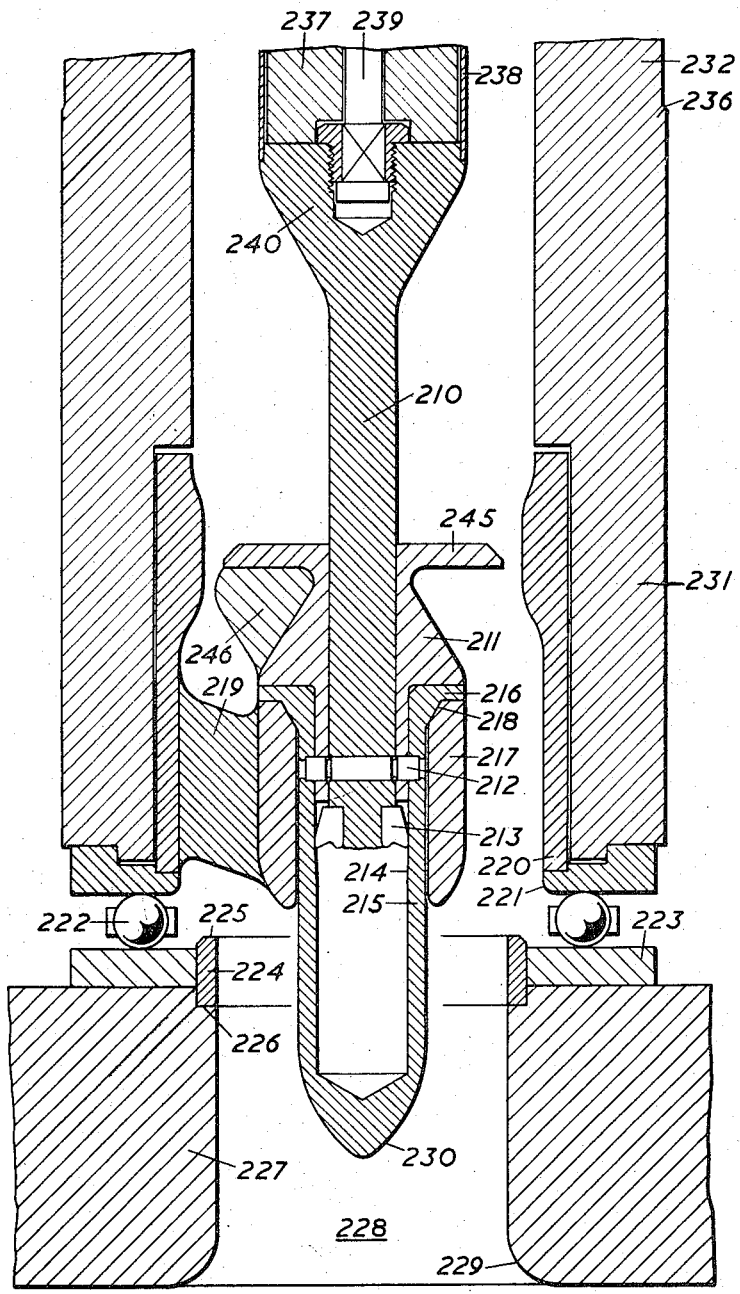

March 10, 1959  F. G. GREENHALGH ET AL  2,877,170
SUPPORT DEVICE FOR USE IN A NUCLEAR REACTOR
Filed Aug. 24, 1955  2 Sheets-Sheet 1

FRANK GEOFFREY GREENHALGH,
EVERETT LONG,
Inventors
By
Attorneys

United States Patent Office 2,877,170
Patented Mar. 10, 1959

2,877,170

SUPPORT DEVICE FOR USE IN A NUCLEAR REACTOR

Frank Geoffrey Greenhalgh, Wigan, and Everett Long, Warrington, England, assignors, by mesne assignments, to the United States of America as represented by the United States Atomic Energy Commission Application August 24, 1955, Serial No. 530,231

4 Claims. (Cl. 204—193.2)

This invention relates to support devices for use in nuclear reactors having a vertical orientation and the invention provides supports for columns of moderator material and for columns of fuel elements constituting the core of a nuclear reactor. Reactors having a vertical orientation are disclosed in U. S. Patent No. 2,708,656 Fig. 23 and column 23, lines 37–40 and in the copending application Serial No. 444,964, filed July 22, 1954, now United States Patent No. 2,863,815 issued December 9, 1958.

Two main problems arise in the design of a vertically orientated reactor which are concerned with support of the fuel elements and the moderator material. The first problem arises out of differential thermal expansion between the moderator structure and the base member supporting the reactor core and the second problem is to provide a support for the fuel elements which keeps the fuel elements centred and supported in their channels in the moderator structure whilst being resilient in the event of a fuel element falling freely on to the supports. Differential thermal expansions can set up stresses and movements which may cause instability or fracture of the moderator structure and impact between fuel elements and rigid supports may cause bursting of the protective sheaths of the elements so as to contaminate the reactor.

Other problems which necessarily arise, but which are not only characteristic of vertically orientated reactors, are those of minimising pumping power losses on entry and departure of a coolant fluid to and from fuel-element channels in the moderator and that of controlling the flow of coolant fluid in the channels so as to achieve an approximately uniform temperature rise through all channels.

Accordingly it is the principal object of the present invention to provide support devices for vertical columns of fuel elements and moderator material constituting the core of a nuclear reactor having the property of resilience under impact by falling fuel elements and the property of accommodating differential thermal expansions between the base support members and moderator and fuel elements supported by those base members.

The support device of the present invention comprises means for supporting and axially locating a column of moderator material and providing a coolant fluid entry to a vertical fuel element channel defined by and passing through said column of moderator material; means permitting free movement of said supporting and axially locating means over a base member; a boss joined with and coaxial to said supporting and locating means; a guide member carried freely in said boss; a fuel element support member penetrating into said guide and latched therein by a device releasable when the load in the fuel element support member exceeds a predetermined figure; blade means carried by said fuel element support member; and a member, also carried freely in said boss, exposing a surface to be cut by said blade means when said latch device is released.

Figure 2:
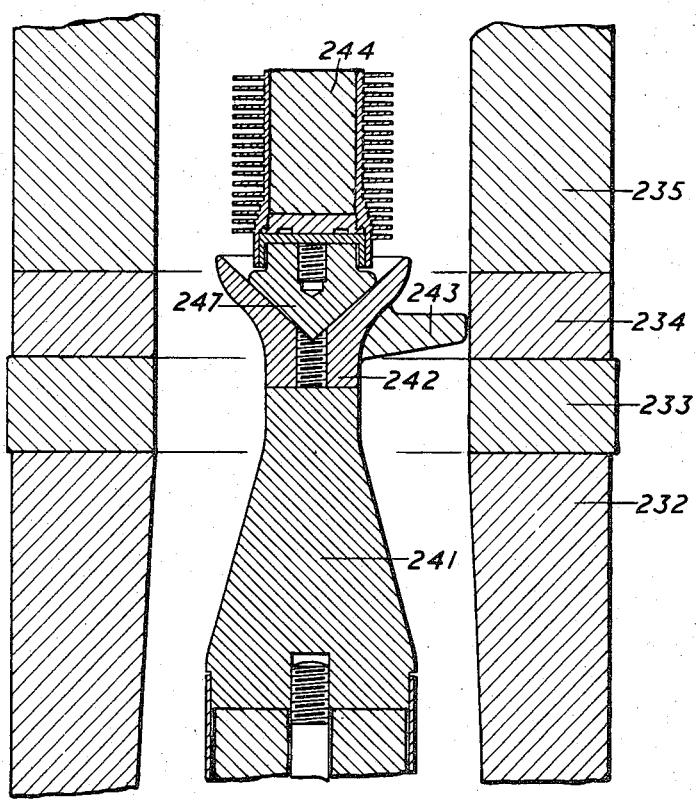

A support device according to the invention will now be described with reference to the accompanying drawings which show a sectional view of the bottom end of a nuclear reactor fuel element channel divided over in the two drawings identified as Figs. 1 and 2.

A load support strut 210 is located in a guide 211 by a shear pin 212. Attached to the strut 210 there are four blades 213 having quadrant circular cutting edges which can move over the inner wall 214 of a member 215. The tubular member 215 has a flange 216 which rests on a boss 217 having a tapered entry 218. The boss 217 is supported by three webs 219 which are part of a locating sleeve 220 resting on a top steel plate 221 mounted on a ball race 222 on a bottom steel plate 223. The plate 223 is located by a ring 224 which at the upper end 225 limits the movement of the ball race 222 and at the lower end 226 locates in a main 4" support plate 227. The plate 227 is provided with a hole 228 having a throat 229. The member 215 has a smoothed and shaped end 230 so as to offer minimum resistance to gas flow upwards through the hole 228.

The top plate 221 and sleeve 220 serves to support and axially locate a graphite column 231 which is one of many similar columns, all adjacent at their base, which go to form the graphite moderator structure of a nuclear reactor. The lowest brick 232 of the column is shown surmounted by two tiles 233, 234 and above that a further graphite brick 235. The brick 235 is one of the lowest layer of bricks of the moderator structure proper. The brick 232 is one of the layer of bricks forming the bottom graphite reflector of the reactor. The tiles 233, 234 are devised to allow for Wigner growth. The brick 232 has a step 236 and that part below the step is considered to be free of Wigner growth and it is these lower parts that butt together on adjacent bricks to keep the moderator structure rigid. The bearing 222 allows for differential thermal expansion between the plate 227 and the graphite.

The strut 210 is made of low neutron absorbing material (such as magnesium) and it supports a graphite pillar 237 encased in a magnesium can 238 and has a centre tie rod 239 screwed into a boss 240 at the top of strut 210. A boss 241 is provided at the other end of the rod 239 and this carries a conical member 242 having three locating legs 243. A fuel element 244 having a cone 247 locating in the member 242 is partly shown.

The guide 211 has a flange 245 and webs 246. The diameter of the flange is determined by the amount of "gagging" required on the gas passing up through the hole 228 to provide a temperature rise of gas in passing through the reactor core which is approximately equal to the temperature rise in other channels in the core.

The shear pin 212 is arranged to pass through both the guide 211 and the member 215. Should a major impact occur on the strut 210, such as by a free falling fuel element striking the conical member 242, part of the impact is absorbed in the shearing of the pin 212 as the strut 210 is driven down the guide 211 and the remainder of the impact is absorbed progressively as the blades 213 cut into the inner wall 214 of the member 215 thus avoiding the setting up of large stresses in the fuel element as would occur if suddenly arrested. A minor impact, such as may reasonably occur in introducing fuel elements into the reactor, is resisted by the strength of the shear pin. Once the shear pin is broken and the blades have cut the wall 214, parts located by the boss 217 require replacement. This is provided for by arranging that the base of the blades 213 overhangs the end of the member 210 so that on withdrawing the parts located by the boss 217 from the reactor by lifting on the locating legs 243 the base of the blades 213 lift on the guide 211 which transmits a lift to the member 215 by way of the ends of the broken pin 212.

We claim:

1. A support device for use in a nuclear reactor having a vertical orientation comprising means for supporting and axially locating a column of moderator material and providing a coolant fluid entry to a vertical fuel element channel defined by and passing through said column of moderator material; a boss joined with and coaxial to said supporting and axially locating means; a tubular member slidably carried within said boss; a guide member slidably carried within the tubular member; a fuel element support member having a freely sliding fit within said guide member and held therein by latch means releasable under predetermined overload, the lower end of the support member normally extends below the lower end of the guide member; and blade means carried on the lower end of the support member engaging the internal surface of the tubular member to cut said surface upon release of said latch means.

2. A support device as claimed in claim 1 wherein a means permitting free movement of the supporting and axially locating means over a base member is provided and comprises a ball and cage assembly supporting said supporting and locating means and movable over a plate having a collar internal to the ball and cage assembly, said collar defining an aperture through the plate leading into said fuel element channel, the collar extending above and below the plate so that the part extending above serves to limit the degree of movement of the ball and cage assembly and the part extending below serves to locate said collar coaxially with a coolant fluid entry hole in the base member.

3. A support device as claimed in claim 1 wherein said means for supporting and axially locating a column of moderator material comprises in part a sleeve lining the inner wall of the moderator column at one end, and said guide member has a flange which in conjunction with said sleeve part forms a partial gag of smooth contour and controlled size across the defined fuel element channel so that the coolant flow through that fuel element channel can be controlled relative to the flow through other fuel element channels.

4. A support device as claimed in claim 1 wherein the internal surface of the tubular member is cylindrical and is the surface which slidably receives the guide member, said tubular member, guide member, fuel element support member and boss all being coaxial, and wherein the latch means comprises a shear pin extending through the fuel element support member and guide member with its ends extending into the tubular member, and being adapted to shear on movement of the fuel element support member in the guide member and to withdraw the tubular member from the boss together with the guide member when the latter is withdrawn for the purpose of replacing the shorn pin.

References Cited in the file of this patent
UNITED STATES PATENTS

| | | |
|---|---|---|
| 2,401,748 | Dillon | June 11, 1946 |
| 2,615,373 | Pegard | Oct. 28, 1952 |
| 2,708,656 | Fermi et al. | May 17, 1955 |
| 2,776,695 | Wells | Jan. 8, 1957 |
| 2,811,385 | Butler | Oct. 29, 1957 |